US009912712B2

(12) United States Patent
McCoy et al.

(10) Patent No.: US 9,912,712 B2
(45) Date of Patent: *Mar. 6, 2018

(54) METHOD AND APPARATUS FOR USE IN TRACKING PLAYBACK OF MEDIA STREAMS WHILE IN STAND-BY MODE

(71) Applicants: Sony Corporation, Tokyo (JP); Sony Network Entertainment International LLC, Los Angeles, CA (US)

(72) Inventors: Charles McCoy, Coronado, CA (US); Ling Jun Wong, Escondido, CA (US); True Xiong, San Diego, CA (US)

(73) Assignees: Sony Corporation, Tokyo (JP); Sony Network Entertainment International LLC, Los Angeles, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 14/325,108

(22) Filed: Jul. 7, 2014

(65) Prior Publication Data

US 2014/0325029 A1    Oct. 30, 2014

Related U.S. Application Data

(63) Continuation of application No. 13/077,739, filed on Mar. 31, 2011, now Pat. No. 8,775,664.

(Continued)

(51) Int. Cl.
*G06F 15/16* (2006.01)
*H04L 29/06* (2006.01)
(Continued)

(52) U.S. Cl.
CPC .......... *H04L 65/60* (2013.01); *H04L 65/602* (2013.01); *H04N 21/4333* (2013.01); *H04N 21/4436* (2013.01); *H04L 65/4084* (2013.01)

(58) Field of Classification Search
CPC ... H04L 65/601; H04L 65/602; H04L 65/604; H04L 65/605; H04L 65/4084; G06F 17/3002

See application file for complete search history.

(56) References Cited

U.S. PATENT DOCUMENTS 6,415,326 B1    7/2002  Gupta
7,120,112 B1   10/2006  Metzger
(Continued)

OTHER PUBLICATIONS

Charter (Charter, Entertainment the way you want it! Your guide to getting the most from Charter DVR, 2008, charter.com, Charter DVR User Guide, pp. 1-34).*

(Continued)

*Primary Examiner* — Michael A Keller
(74) *Attorney, Agent, or Firm* — Fitch, Even, Tabin & Flannery LLP

(57) ABSTRACT

Some embodiments provide methods, systems and apparatuses for use in managing playback of content. Some of these methods comprise: maintaining, at a playback device, a first media stream in a stand-by mode; continuing to acquire, from over a distributed network while in the stand-by mode, one or more index files of the first media stream, where the one or more index files identify a plurality of media files of the first media stream configured to be played back at the playback device, while not acquiring the media files of the first media stream while the first media stream is in the stand-by mode; and tracking the one or more index files relative to a playback timing of the first media stream while in the stand-by mode, where the playback timing continues to increment while the first media stream is in the stand-by mode.

18 Claims, 7 Drawing Sheets

Related U.S. Application Data

(60) Provisional application No. 61/443,368, filed on Feb. 16, 2011.

(51) Int. Cl.
*H04N 21/433* (2011.01)
*H04N 21/443* (2011.01)

(56) References Cited

U.S. PATENT DOCUMENTS

| | | | |
|---|---|---|---|
| 7,149,359 | B1 | 12/2006 | Omoigui |
| 8,089,987 | B2 | 1/2012 | Spicer |
| 8,321,905 | B1 | 11/2012 | Streeter |
| 8,775,664 | B2 | 7/2014 | McCoy |
| 2002/0133247 | A1 | 9/2002 | Smith |
| 2006/0085551 | A1 | 4/2006 | Xie |
| 2007/0067484 | A1 | 3/2007 | Cheung |
| 2007/0250901 | A1 | 10/2007 | McIntire |
| 2007/0266409 | A1* | 11/2007 | Hsu .................. H04H 20/08 725/78 |
| 2009/0052661 | A1 | 2/2009 | Fahrny |
| 2009/0136204 | A1 | 5/2009 | Chen |
| 2009/0204630 | A1* | 8/2009 | Lai .................. G11B 27/322 |
| 2009/0259653 | A1 | 10/2009 | Obana |
| 2009/0300203 | A1 | 12/2009 | Virdi |
| 2010/0085963 | A1 | 4/2010 | Bekiares |
| 2010/0135636 | A1 | 6/2010 | Zhang |
| 2010/0153566 | A1* | 6/2010 | Sheleheda ......... G06F 17/30997 709/229 |
| 2010/0223357 | A1 | 9/2010 | Einarsson |
| 2010/0235472 | A1 | 9/2010 | Sood |
| 2010/0293187 | A1 | 11/2010 | Biehn |
| 2010/0312828 | A1 | 12/2010 | Besserglick |
| 2011/0080940 | A1* | 4/2011 | Bocharov .......... H04N 21/4331 375/240.01 |
| 2011/0083144 | A1 | 4/2011 | Bocharov |
| 2012/0023155 | A1 | 1/2012 | Myers |

OTHER PUBLICATIONS

Charter; Charter, Entertainment the way you want it! Your guide to getting the most from Charter DVR; 2008; Charter.com; Charter DVR User Guide; pp. 1-34.
Prince McLean; "Apple Launches HTTP Live Streaming Standard in iPhone 3.0"; http://appleinsider.com/articles/09/07/08/apple_launches_http_live_streaming_standard_in_iphone_3_0; Jul. 8, 2009; 10 Pages.
Hargray; Hargray; Residential Television; 2009; Hargray.net; Hargray Communications; p. 1.
MythTV; MythTV, User Manual:Watch TV; Oct. 18, 2010; http://www.mythtv.org/wiki/User_Manual:Watch_TV; pp. 1-8.
YBK; YBK, Recording Relaying PVR; 2010; http://www.ybkenterprises.com/products/dms-1200-1500.html; YBK Enterprises Inc.; pp. 1-3.
U.S. Appl. No. 13/077,739; Non-Final Office Action dated Jan. 9, 2013.
U.S. Appl. No. 13/077,739; Interview Summary dated Apr. 8, 2013.
U.S. Appl. No. 13/077,739; Final Office Action dated Apr. 22, 2013.
U.S. Appl. No. 13/077,739; Non-Final Office Action dated Oct. 3, 2013.
U.S. Appl. No. 13/077,739; Notice of Allowance dated Feb. 27, 2014.

* cited by examiner

METHOD AND APPARATUS FOR USE IN TRACKING PLAYBACK OF MEDIA STREAMS WHILE IN STAND-BY MODE

This application is a continuation of U.S. application Ser. No. 13/077,739, filed Mar. 31, 2011, for McCoy et al., entitled METHOD AND APPARATUS FOR USE IN TRACKING PLAYBACK OF MEDIA STREAMS WHILE IN STAND-BY MODE, which claims the benefit of U.S. Provisional Application No. 61/443,368, filed Feb. 16, 2011, for McCoy et al., entitled METHOD AND APPARATUS FOR ACCESSING LIVE MEDIA STREAMS USING INDEX FILES, which is incorporated in its entirety herein by reference.

BACKGROUND

1. Field of the Invention

The present invention relates generally to managing content, and more specifically to managing the playback of content.

2. Discussion of the Related Art

The distribution of information and content has dramatically increased. Many devices have been configured to take advantage of this increased distribution. In some instances, devices are configured to receive content from remote sources that can be played back through the device. Further, the content may be acquired on demand.

SUMMARY OF THE INVENTION

Several embodiments of the invention advantageously address the needs above as well as other needs by providing methods, systems and apparatuses for use in managing playback of content. Some of these methods comprise: maintaining, at a playback device, a first media stream in a stand-by mode; continuing to acquire, from over a distributed network while in the stand-by mode, one or more index files of the first media stream, where the one or more index files identify a plurality of media files of the first media stream configured to be played back at the playback device, while not acquiring the media files of the first media stream while the first media stream is in the stand-by mode; and tracking the one or more index files relative to a playback timing of the first media stream while in the stand-by mode, where the playback timing continues to increment while the first media stream is in the stand-by mode.

Other embodiments provide methods of playing back content. Some of these embodiments comprise: playing back at a playback device a first media stream being received from over an Internet protocol (IP) distributed network while the media stream is being played back; detecting, at the playback device, an instruction to transition the first media stream to a stand-by mode; halting, in response to receiving the instruction to transition to the stand-by mode, the playback of the first media stream; and tracking a first index file of the first media stream relative to playback timing of the first media stream while in the stand by mode, and while not playing back the first media stream and not requesting, from over the distributed network, media files corresponding to the entries in the first index file.

Still other embodiments provide computer program product comprising a medium for embodying a computer program for input to a processor based system and a computer program embodied in the medium for causing the processor based system to perform steps comprising: maintaining, at a playback device, a first media stream in a stand-by mode; continuing to request, from over a distributed network, a first index file of the first media stream, where the first index file identifies a plurality of media files of the first media stream configured to be played back at the playback device, while not acquiring the media files of the first media stream while the first media stream is in the stand-by mode; and tracking, while in the stand-by mode, the first index file relative to a playback timing of the first media stream, where the playback timing continues to increment while the first media stream is in the stand-by mode.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
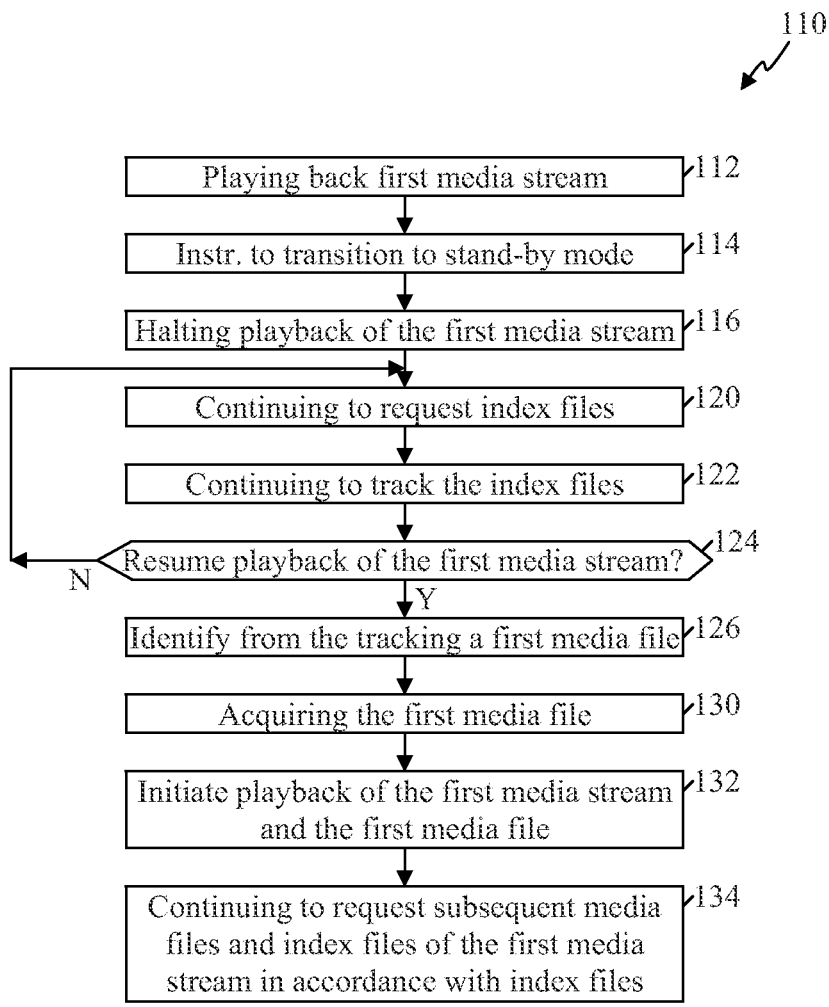
FIG. 1 depicts a simplified flow diagram of a process according to some embodiments in managing the playback of content, such as content acquired over a distributed Internet Protocol (IP) network.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," "some embodiments," "some implementations," or similar language means that a particular feature, structure, or characteristic described in connection with the embodiment is included in at least one embodiment of the present invention. Thus, appearances of the phrases "in some embodiment," "in some implementations,"

and similar language throughout this specification may, but do not necessarily, all refer to the same embodiment.

Some embodiments of the present invention are directed to methods, systems and apparatuses for use in managing media streams. These embodiments reduce lag times in returning from a stand-by mode or state to resume playback of a media stream. In some implementations, a playback device can maintain a media stream in a stand-by mode. When operating in a stand-by mode, one or more index files of the media stream continue to be requested from a remote source while requests for media files associated with the index files are halted. The index files continue to be monitored or tracked relative to playback timing of the media stream. The corresponding media files identified in the index files, however, are not obtained and not played back while in the stand-by mode. Typically, this greatly reduced the utilized network bandwidth because of the size of the media files and the number of media files that are not received. By tracking the index file, once a request to resume playback of the media stream is received the current media file corresponding with the playback timing at the time of the request is known and can quickly be retrieved. This can greatly reduce lag time in resuming playback of the media stream because the playback device does not having to request an index file from a remote source, receive the index file, identify where in the index file playback is occurring, determine a relevant timing, identifying the relevant media file corresponding to timing, and then issuing a request for the media file. The reduced lag time can improve a users experience and achieve greater user satisfaction.

According to some embodiments, media streams, such as some live media streams, comprise one or more index files and a series of media files. In some instances, media streams may additionally comprise metadata and/or other files, such as a header file having information about the stream, such as the stream size, codecs, bitrates, metadata about the content in the stream, such as title, description, rating, duration and/or other information as well as offset between segments. Index files typically include: a list of media files and a corresponding list of access information (e.g., Uniform Resource Locators (URL)) associated with the list of media files that can be used in acquiring the media files for playback. In some instances, index files can additionally include metadata of each media file; time stamps of each media file; and/or other data that may be utilized with the index file. An illustrative format of the index file may be an index file configured according to the M3U8 Internet Engineering Task Force (IETF) standard. Many media files include still image data, audio data, video data, or a combination of two or more of images, audio data and video data. An index file typically has a much smaller data size than that of the associated media files identified in the index file.

Media files typically include data about a predetermined period or a segment of an underlying media event. For example, a producer of a media event may create a media file for every few minutes of an event and update the index file. The time interval of a media file may be modified or changed by the producer. In playing back a media stream, such as a live media event played back on a playback device (e.g., an Internet Protocol Television (IPTV) device), the playback device obtains the index file and then retrieves and plays each media file specified in the index list in accordance with playback timing, which can also be dictated by and/or tracked through the index file. The playback device, in some instances, obtains one or more subsequent index files for a media stream and/or may reload an index file listing further media files to discover additional segments of the media stream. For example, in some embodiments an IPTV device loops through index files, making a new request to get the latest index file at the proper time based on information in the current index file, and sequentially acquires the media files identified in the index files in accordance with playback timing to playback the media files, and in some instances to playback the media files in a continuous stream.

While viewing a first media stream, however, a user watching the first media stream on a playback device may elect to transition to a different media stream or otherwise interrupt, halt or pause playback of the first media stream. The transition to different media stream typically caused prior playback devices to halt playback and discard index files and media files associated with the first media stream. When the user requests that the playback device resume playback of the first media stream, the playback device typically had to request from a source the current index file, identify a relevant playback timing, identify within the index file a media stream corresponding to the playback timing and then acquire from a remote source the relevant media file and subsequent media files as defined in the index file. This reacquisition of the index file and identification of a relevant media file defined in the index file typically resulted in extensive lags in time before playback of the first media stream resumed.

Alternatively, some present embodiments transition to a stand-by mode in response to receiving a request to transition to a different media stream or other instruction to interrupt playback of a first media stream. In the stand-by mode the playback device continues to track the one or more index files. In response to a request to resume playback of the first media stream, the playback device already has the current index files and because the playback device continued to track the index file the media file to be retrieved is also known. As such, the playback device simply acquires the relevant media file allowing playback to be initiated with significantly reduced lag.

The reduced lag time when switching from stand-by mode to playback mode or state (playing a media stream) is accomplished by having a playback device (e.g., an IPTV device such as a TV, a mobile phone, a computer or other relevant device) continue to request the index files that are used to play back the media stream. While in stand-by mode relative to a specific media stream, the playback device does not request the media files corresponding to that media stream and does not playback the media stream.

When the media stream is in stand-by, the player device, reproducing device or display device monitors the index files that continue to be received, and tracks the progress of the media stream through the index files relative to playback timing that continues incrementing even when in stand-by mode. As such, the playback device can readily obtain the current location information of relevant media files, such that when playback is resumed, the playback device can quickly request the media file indicated in the latest index file corresponding to the current playback timing to begin playback. Since the index files are received during the stand-by mode, there is no need, at change over to the playback mode, to request index files or information. Additionally, because the index file continues to be tracked relative to playback timing that continues incrementing as if playback had continued, the current media file entry in the index file is known. The playback device has the location information (e.g., a URL) for the current media file in the media stream and may directly request the media file.

FIG. 1 depicts a simplified flow diagram of a process 110 according to some embodiments in managing the playback of content, such as content acquired over a distributed Internet Protocol (IP) network. In step 112, the playback device (e.g., an IPTV) continues to playback a media stream (e.g., a live media stream, previously recorded media stream). In step 114 instructions are received or otherwise detected to transition the media stream to a stand-by mode. In response to this instruction, the stand-by mode is initiated and the playback of the media stream is halted in step 116. The process 110 continues to step 120 where index files continue to be requested when relevant.

In step 122, the index files continue to be tracked or otherwise monitored. For example, playback timing may be tracked relative to the media stream, and the identifiers of the media files defined in the index files can be tracked in accordance with the playback timing. In step 124, it is determined whether to resume playback of the media stream. For example, it can be determined whether an instruction is received to transition from the playback of a second media stream or other media content back to the media stream in stand-by. When an instruction to resume playback is not received the process 110 maintains the stand-by mode and returns to step 120 and/or 122 to continue to acquire index files when relevant and to continue to track the index files relative to the playback timing of the first media stream. Typically, the playback timing continues to increment while the first media stream is in the stand-by mode as if the first media stream were still being played back.

Alternatively, when an instruction is received to resume playback, the process continues to step 126 where a relevant media file is identified as a result of the tracking. For example, a relevant media file corresponding to the playback timing at the time the request to resume playback is received can be identified. In step 130 the relevant media file is acquired. For example, the index file may specify a URL that can be used by the playback device to acquire the media file from a remote source accessed over a distributed network, such as the Internet.

In step 132, playback of the media stream is resumed. For example, once a sufficient amount of the media file or multiple media files as defined in the index file are retrieved the playback device can begin playing back the content. In step 134, playback mode continues such that index files and media files continue to be acquired as dictated by the index files and the playback device continues to playback the media files.

When a playback device is applying a stand-by mode to a media stream (e.g., live or prerecorded media stream received over a network) the playback device may continue to intermittently request the index files to continue to track a current playback point in the media stream relative to playback timing that continues to increment as if the playback were still continuing. The playback device may, or may not, request the media files indicated in the index files since the media stream in stand-by mode is not actively being played back. The lag to initiate playback is significantly reduced when the operating state of the playback device changes from the stand-by mode to a playback mode because the playback device already has current index information from the already obtained and tracked index file, such as an identification of a current media file and associated access to the media file (e.g., URL). The playback device does not need to make a request to obtain a current index file for the current point in the media stream. As a result, the playback device can begin playback from the current point of the stream in less time (substantially in real-time) since it already has, from the index file, and knows the URL of the relevant media file for the current point in the playback operation of the media stream. Further, with live content it may be desirable to reduce the lag between when the content is produced and/or captured and when it is played back.

In some embodiments, by continuing to track the timing and index file of the media stream while in stand-by mode, playback of the media stream can resume with substantially the exact same timing, for example, showing the same frame of video at the same time as if the media stream had continued to playback and not entered stand-by mode and later been resumed. This can in some instances provide a better user experience, such as, when a user flips between media streams as the relative timing between them would remain consistent. This could also provide a better user experience when, for example, quickly switching between media streams, such as when monitoring security cameras, as the timing is consistent instead of jumping around when resuming playback of the stream.

In some embodiments, the transition from the stand-by mode to the playback mode may be indicated to a user, for example to confirm to the user that the instruction to resume playback of a media stream has been received. In some instances, when switching from the stand-by mode to the playback mode of a media stream, a notification can be displayed or otherwise generated (e.g., audio signal). In other instances where an alternative media stream is being played back while a first media stream is in stand-by the currently displayed content of the alternative media stream may be dimmed while the relevant one or more media files of the first media stream is being requested and decoded. The playback device can then replace the current content being dimmed by the playing back of the relevant media file of the first media stream once the playback device is able to render the first media stream (e.g., the playback device has cached a desired amount of the media file, the playback device is able to render the first frame of the first media stream, and/or other such conditions being met).

The dimming of the content or media stream being displayed or otherwise played back at the time of the instruction to initiate playback of the first media stream gives a user substantially immediate feedback that the instruction or request to initiate playback of the first media stream (e.g., switch away from the alternate media stream) has been received by the playback device. Again, other notifiers can be used to inform the user that the instruction was received and is being implemented. For example, notification can be provided by, but not limited to, a flashing light (e.g., on the playback device or a remote control communicating with the playback device), a colored light, the playback of the alternate media stream can be frozen (e.g., frozen on a single frame), a video segment may be repeated, one or more words may be displayed (e.g., a title of the first media stream), or other such notifiers or combinations of such notifiers.

This notification can prevent a user from repeating the request to transition from stand-by mode to playback mode relative to an identified media stream because the user may mistakenly think that his command has not been received by the playback device. Further, the indication or notification can further provide the user with a more user friendly transition, such as an appearance of still further reduced lag. For example, by dimming a currently played back content while acquiring the first media file of the first media stream the there will be portions of the currently played back media stream being played back and dimmed, thereby eliminating a time period when nothing is being played back. This transition technique may provide a smoother transition between stand-by mode and play back mode, and in some instances can give the user the impression that the transition is quicker.

Figure 2:
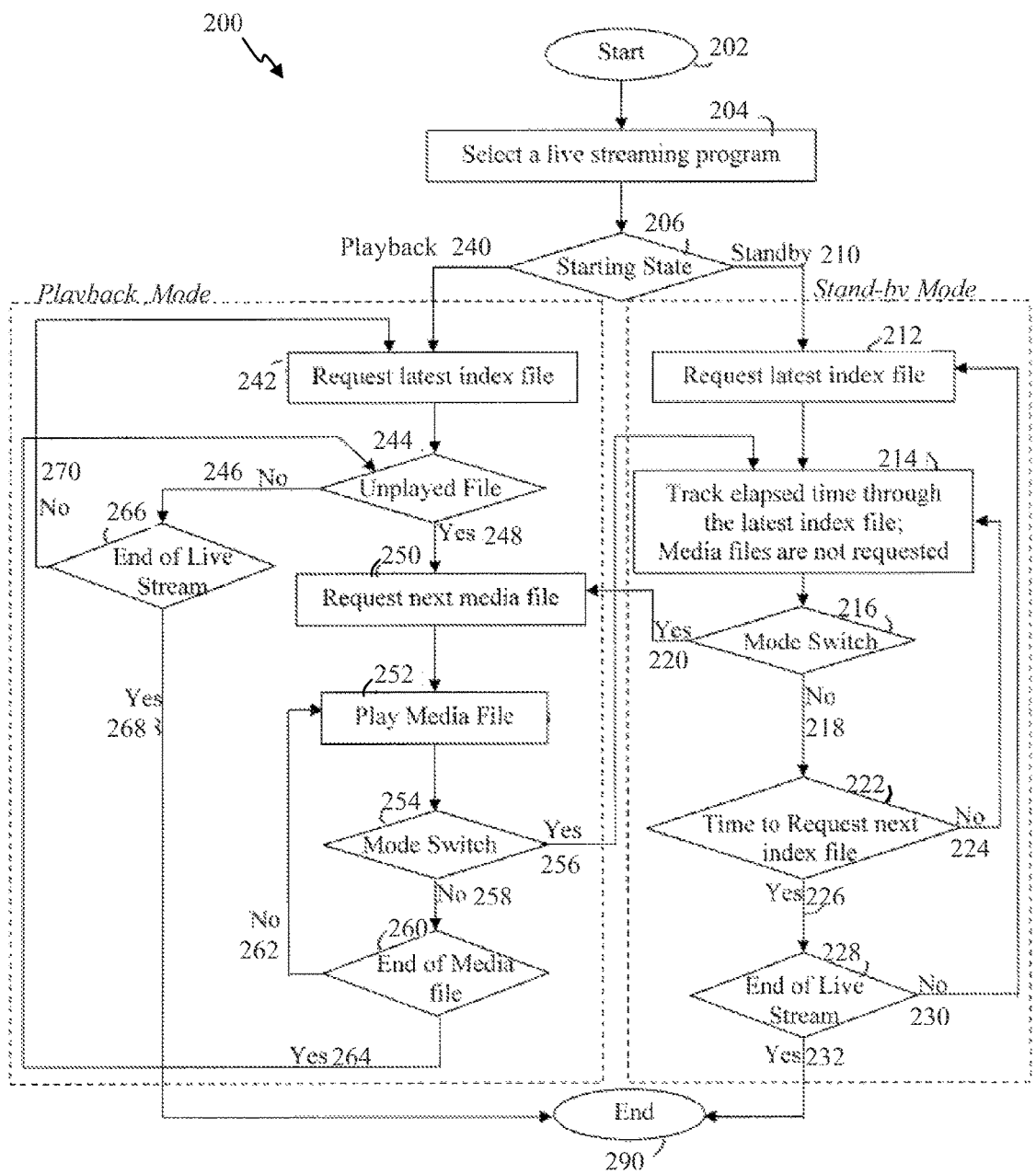
FIG. 2 illustrates a flow diagram of a process for use in managing a media stream according to some embodiments.

FIG. 2 illustrates a flow diagram of a process 200 for use in managing a media stream according to some embodiments. The process is initiated at step 202. For example, the playback device may be instructed to active playback of a first media stream, the playback device may be turned on (e.g., a managing application is automatically executed when the playback device is turned on), or some other activation of the process 200.

In step 204, a first media stream is selected. For example, a user may select the first media stream from a listing provided through a user interface or web interface supplied by a remote service accessed by the playback device over a distributed network. Additionally or alternatively, a managing application of the playback device may obtain stream and/or program information about one or more media streams, including the first media stream, which may be for example a prerecorded program or a live streaming program to be played. The program information may be obtained through one or more ways or methods. For example, the program information may be included in an electronic program guide. In another example, the playback device may query a remote server accessed over a distributed network for a media stream and corresponding program information. Yet, in another example, the playback device is given a command to play the first media stream where the information about that first media stream is contained within the command. The program information may include one or more of a program title, category, broadcasting time, program summary, and other such information.

In response to the selection or other indication of the first media stream, the process continues to step 206 to determine a starting state (or a playback mode) of the first media stream. When it is determined in step 206 that the first media stream (and/or the playback device) is in a stand-by mode 210, the process proceeds to step 212 to execute a managing process for the first media stream in the stand-by mode 210. Alternatively, when it is determined in step 206 that the first media stream to be played back and/or is in a playback mode 240, step 242 is entered to initiate execution of a managing process for the first media stream in a playback mode 240.

In step 212, the playback device (e.g., through a managing application) requests a current or the latest index file in the first media stream, such as from a remote source accessed over a distributed network. In step 214, elapsed playback timing is tracked and entries or media file identifiers are tracked through the acquired index file corresponding to the playback timing that continues to increment. It is noted that at step 214, the media files associated with the entries in the index file are not requested as the media stream is not currently being played back (and not being viewed by the user) while in the stand-by mode. By not acquiring the corresponding media files, the traffic load of the network is significantly reduced relative to if the media files were requested, and allows the stand-by mode 210 to use much less bandwidth than would otherwise be used if the media files were requested. This can further improve performance, for example, if other content and/or another second media stream is being played back (through the playback mode 240) while the first media stream is in stand-by.

At step 216, it is determined whether a switch to the playback mode 240 is to be implemented. For example, it can be determined whether an instruction received from a user to activate playback of the first media stream and/or to switch from playing back a second media stream or other content to playing back the first media stream. When the mode is to be switched to the playback mode the process switches (line 220) from the stand-by mode 210 to the playback mode 240, and continues to step 250 to request a media file in accordance with the tracking of the index file and as identified by an entry in the index file corresponding to the tracked playback timing. The playback device instead can directly request the identified media file (e.g., using a URL specified in the current index file). Again, because the current index file was already obtained at the playback device in step 212 before switching from the stand-by mode, the current index file does not need to be requested at step 250. Additionally, because the index file continued to be tracked relative to the playback timing that continued to increment while in the stand-by mode, the current media file entry and corresponding link, URL or other access information in the index file is readily identified. Thus, the time until playback begins and the lag to initiate playback are significantly reduced when switching from the stand-by mode 210 to the playback mode 240 as the index files and the offset within the index files are tracked at step 214 while in the stand-by mode 210.

When it is determined in step 216 that a switch to the playback mode is not to be initiated, the process continues (as shown by line 218) to step 222 to determine whether to request one or more subsequent index files. The determination at step 222 may be made intermittently, periodically, based on a schedule, when specified in a current index file, when a current playback timing or other relevant time is approaching or is at an end time as identified in the current index file being tracked. When a subsequent index file is not to be requested, the process returns (as indicated by line 224) to step 214 to continue to track the index file currently being evaluated and/or corresponding to the playback timing.

Alternatively, when it is determined in step 222 that a subsequent index file is to be requested (as identified by line 226) step 228 is entered to determine whether an end of the first media stream is reached. When an end is reached (as indicated by line 232) the process ends relative to the first media stream at step 290. Alternatively, the process 200 returns to step 212 (as identified by line 230) when the end is not detected to request the next index file and continue to track the first media stream in the stand-by mode 210.

When it is determined in step 206 that playback of the first media stream is to be initiated, the process 200 advances to step 242 where a current or latest index file is requested from a remote source. In step 244, the index file is evaluated to determine whether the index file identified unplayed media files.

When it is determined that the media files identified in the current index file have been played step 266 is entered (line 246) to determine whether an end of first media stream is reached. When an end of the first media stream is reached (line 268) step 290 is entered terminating the process 200 relative to the first media stream. Alternatively, when it is determined in step 266 that an end of the first media stream is not reached (line 270), the process returns to step 242 to request the next index file and continue the playback of the first media stream in the playback mode 240.

Returning to step 244, when it is determined in step 244 that the index file includes an unplayed media file (line 248), step 250 is entered and a request is issued for a next media file identified according to the playback timing and designated by the index file (e.g., using a URL associated with the unplayed media file identified in the index file). In step, 252 the requested media file to played back as it is being received or after it is received.

In step 254, it is determine whether a switch to the stand-by mode 210 is to be implemented. For example, a user may change a program or channel, a user may pause playback (e.g., pressing a pause button), a user may switches to another video input, a user may issue an instruction to activate the stand-by mode relative to the first media stream, or some other instruction to cause a transition to the stand-by mode. When a switch to the stand-by mode is to occur (line 256) the process 200 advances to step 214 to keep tracking elapsed time and current index file relative to the elapsed time. Further, requests for the media files identified in the index file are stopped.

Alternatively, when it is determined in step 254 that the stand-by mode is not to be activated the process continues to step 260 to determine whether an end of the first media file is reached. When an end of the first media file is not reached (line 262), the process returns to step 252 to continue playing the current media file. In those instances where an end of the media file is reached (line 264), the process 200 returns to step 244 to check whether the index file includes unplayed files.

It is noted that in some embodiments any number of mode switches between the stand-by mode 210 and the playback mode 240 can be implemented. Further, the process 200 can be implemented relative to more than one media stream. For example, one or more media streams can be tracked in the stand-by mode 210 while one or more media streams are played back through the playback mode 240. The mode switch can occur between media streams, and the mode switch between streams may occur, in some implementations, any number of times.

Figure 3:
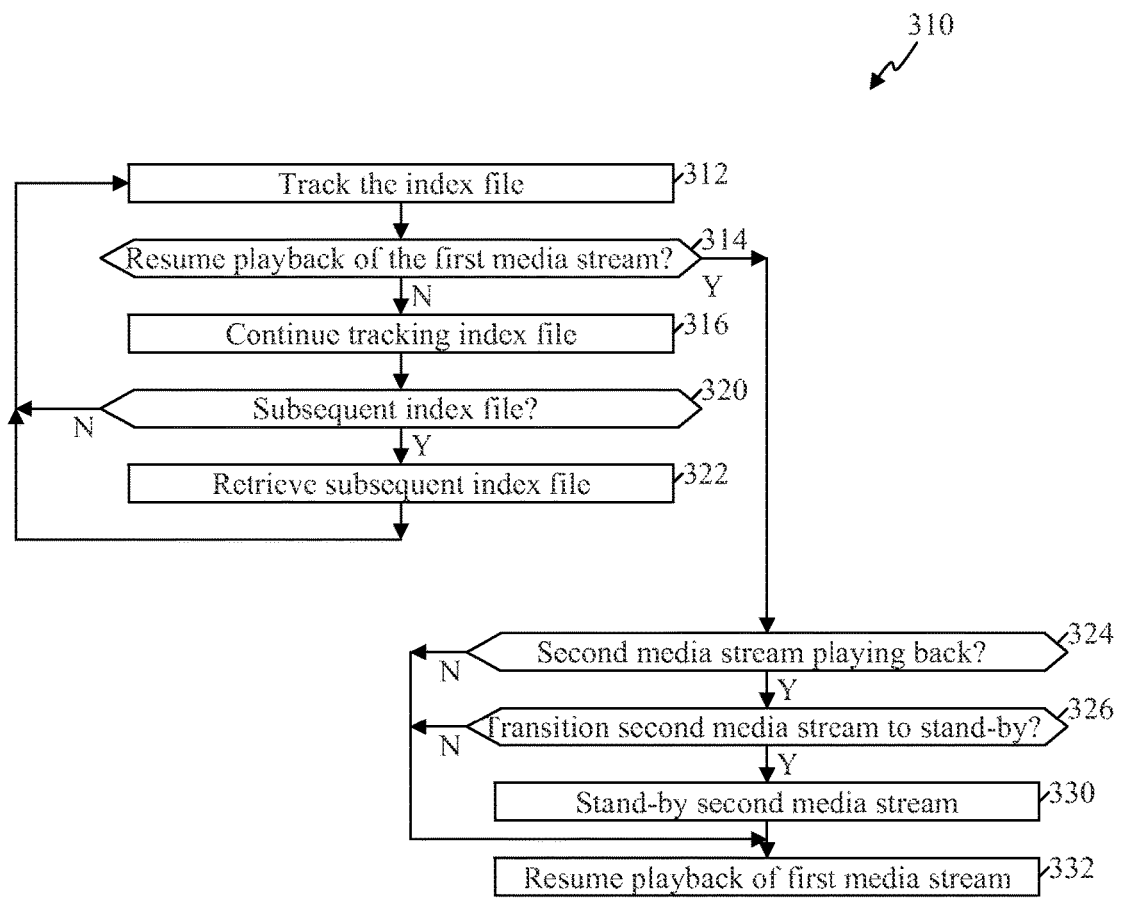
FIG. 3 depicts a simplified flow diagram of a process of managing media streams when a first media stream is in the stand-by mode and not being played back.

FIG. 3 depicts a simplified flow diagram of a process 310 of managing media streams when a first media stream is in the stand-by mode and not being played back. In step 312, a current index file of the first media stream is tracked relative to the continued playback timing corresponding to the first media stream. In step 314 it is determined whether to initiate or resume playback of the first media stream. This determination can be based on an instruction being received from a user or other source, based on a predefined condition occurring (e.g., detecting an occurrence of an event, such as an occurrence of a specified event detected from metadata of the index file or media stream), based on an instruction to record the media stream (e.g., in a digital video recorder device), or the like.

When playback is not to be initiated the process 310 advances to step 316 to continue tracking the index file relative to the advancing playback timing. In step 320 it is determined whether a subsequent index file is to be obtained. When a subsequent index file is not to be obtained the process returns to step 312 to continue tracking the index file. Alternatively, the process advances to step 322 when a subsequent index file is to be obtained where a subsequent index file is acquired. For example, a subsequent index file may automatically be received based on a prior request to access the first media stream, the playback device may issue a request to a remote source for the subsequent index file, or other such methods. Following step 322 the process returns to step 312 to track the subsequent index file.

When it is determined in step 314 to resume or initiate playback of the first media stream the process 310 continues to step 324 where it is determined whether other content is being played back, for example alternate media content, a second media stream or other content is being displayed and/or played back. When other content and/or a second media stream is actively being played back it is determined in step 326 whether to transition the other content to the stand-by mode. In some instances, the other content may not be configured in a format that provides index files. Additionally or alternatively, the playback device may be capable of playing back multiple media streams and/or other content. As such, the playback device may not want to transition the other content or second media stream to the stand-by mode. Alternatively, the instruction to resume playback of the first media stream may be an instruction to change channels, terminate playback of other media content, to change from the second media stream to the first media stream, initiate recording of other content or a second media stream being played back, and/or other such action.

In those instances where the other content is not to be switched to the stand-by mode the process 310 advances to step 332. Alternatively, step 330 is entered where the second media stream is transitioned to the stand-by mode. The process then continues to step 332 to initiate playback and/or recording of the first media stream based on the tracked index file by acquiring the media file corresponding to the playback timing (e.g., the playback timing at the time the instruction to resume playback was received, a playback timing based on some delay applied to a playback timing at the time the instruction was received, or the like).

In some embodiments, the playback device in tracking the index file may further monitor metadata, timing information and/or other information defined and/or provided in the index file or with the media stream. Based on an evaluation of the metadata or other information the playback device may take one or more actions. For example, the playback device may display timing information and/or metadata to the user without a delay or lag; display a title; display a change in titles; display remaining amount of time; display status information; activate recording of the first media stream an alternate media stream and/or other media content; activate transition to the playback mode for the first media stream; activate playback of other media content; the playback device may determine whether an event occurs and take one or more actions when the event occurs and/or one or more alternative actions when the event does not occur; provide notices to a user; display a current title and/or rating of content of the media stream; and/or other such actions. The event can be the detection of a certain playback timing or elapse of timing within an index file; a detection of a transition within a first media stream from a first program (e.g., first television program) to a second program (e.g., second television program); detection of a change of title in a media stream (e.g., a change in naming of the entries in the index file); metadata identifying a certain characteristic regarding the corresponding media stream (e.g., a title of the media stream on stand-by, a change in media stream type, a change in a program type, a score of a sporting event being provided on a media stream that a user has on stand-by, an elapsed time of the media stream, an elapsed time or remaining time of a sporting event, identifying a scene, and/or other such information or combinations of such information); a event occurring within the media stream (e.g., a score occurring during a sporting event, dramatic change in volume, a scene change, an end of a commercial break, or the like); or other such events or combinations of such events. For example, the detection of an event may automatically cause a transition to a playback mode for a previously defined media stream, which in response can be played back and/or recorded. Similar tracking of metadata can occur on one or more other media streams and/or media content, with predefined actions being taken in response to detecting an event. In some instance, the metadata can define the action to be taken, define a code that is used by the playback device to identify an action, or the like. In other instances, the playback device detects the event and identifies an action based on the identified event.

In some instances, the events are based on user defined parameters, user preferences, user profile information, previous user actions, content viewing habits, events defined by a content distributed and/or producer, events defined by content source or server, and/or other such relevant information. Similarly, the event can be predefined prior to detecting the event, as a result of some other occurrence, defined prior to the content being released by a production company or content owner, prior to being distributed over a distributed network to the playback device by a content source or server, or the like. In response to detecting the event, the playback device may take some action. In some instances, the action may be predefined, such as by the user, by a source of the media stream or content, by the playback device, by the metadata, and/or some other source. For example, the playback device may display a notification (e.g., display a title, display a rating of content of the media stream, display an elapsed time, display a remaining amount of time, display a score of a sporting event, display a timeline, time bar or the like of the media stream or the subject of the media stream, display an amount of time remaining in a sporting event, displaying a notice that an alternative title is now playing, ask whether a user wishes to playback and/or record an alternate media stream, identifying a next program to be provided in a media stream, display some of the meta-data and/or the timing from tracking the index files while in stand-by mode; and/or other notifications); automatically shift a media stream from a stand-by mode to a playback mode to playback and/or record the media stream; shift a media stream from a playback mode to a stand-by mode; terminate a stand-by mode for a media stream; cause a media stream to be forwarded to a secondary playback or recording device; or other actions or combinations of such actions. In some instances, the notification may be displayed and/or audio generated even while another media stream and/or other content is not being played back or displayed.

As another example, in some embodiments a title and/or a rating of content of the media stream may be displayed while the media stream is in stand-by mode. This may have benefit in many instances, such as with media streams including content of a concert broadcast or Internet stream of a TV channel when the media stream spans multiple content or program titles. Some implementations may display timing information, such as an elapsed time or location within content, a program and/or the media stream (e.g., displayed along a time line).

Further, in some instances, notifications, metadata and/or other information may be displayed as an overlay over another media stream being played back, displayed in a separate display area, displayed in a minimized player window, interrupt another media stream being played back, temporarily displayed in place of another media stream being played back, displayed as scrolling information, displayed as a timeline or bar, an audio notification, a communication to a secondary device (e.g., a mobile phone), or the like. The actions, for example, can allow a user viewing media streams to keep track of what is going on relative to a first media stream in stand-by (e.g., keeping track of a score of a sporting event) without actually watching the first media stream and/or while playing back different content or a second media stream.

Some embodiments may additionally or alternatively log, record and/or otherwise electronically process meta-data from the index files while in stand-by mode. Index files may have metadata information appended to them, such as events that may have occurred since the last index file was generated, which may be logged by monitoring applications, even when the stream is being tracked in stand-by mode. For example, a security camera monitoring application can log door open/close events and badges read at a door or other point monitored by a security camera from metadata in the index files even when the media stream containing the video from a security camera was not transmitted over a network. Similarly, the index metadata could also include information about points of interest that were identified, such as when a motion detector or video monitoring software detected motion, in the media since the last index file was generated, allowing software monitoring in stand-by mode to know of these points of interest and to go back and request the media associated with these points. This would allow, for example, a security monitoring application to monitor the index files from a plurality of security cameras, and when motion is detected by one of those cameras, the monitoring application can then request and record the media for a time frame around that identified interesting point, including a certain amount of time before the start of the interesting period. Accordingly, in some instances, the media that is requested over the network may be limited to the media identified as being of interest for a stream that is in stand-by mode and not being watched.

Figure 4:
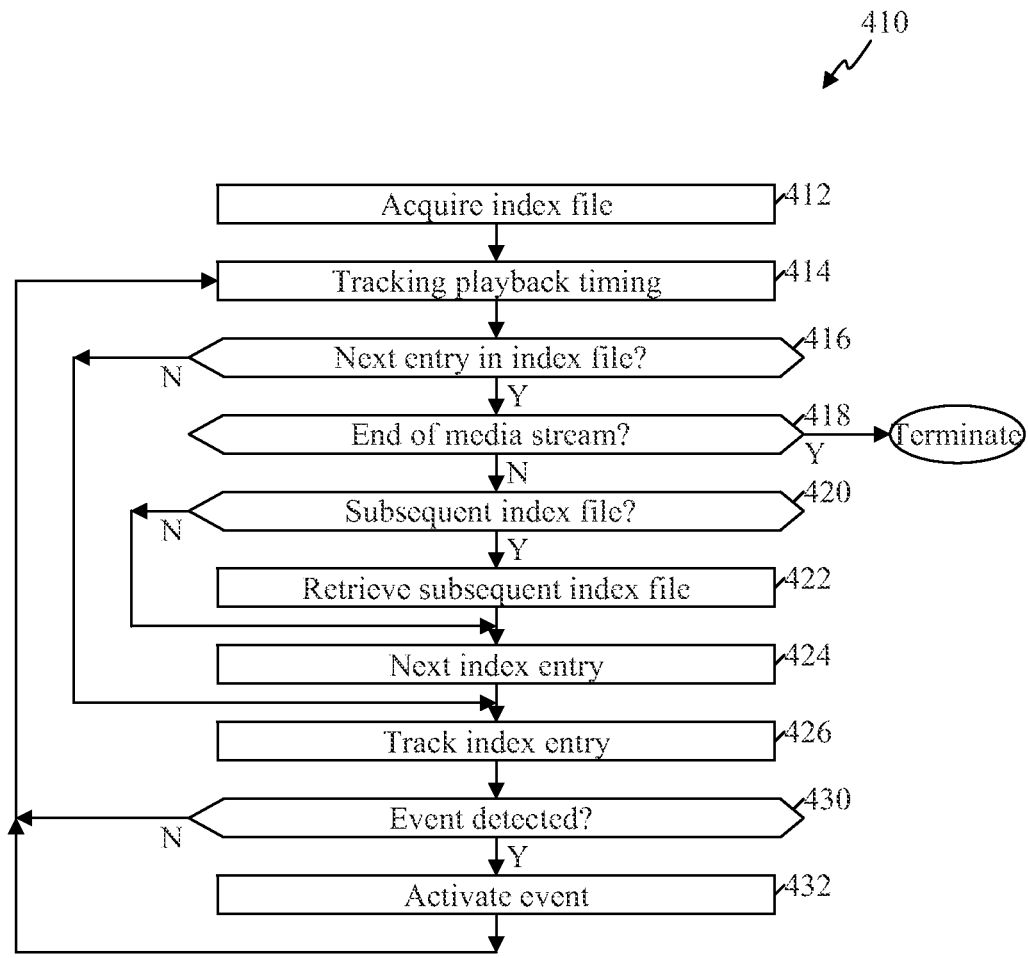
FIG. 4 depicts a simplified flow diagram of a process of managing a media stream according to some embodiments.

FIG. 4 depicts a simplified flow diagram of a process 410 of managing a media stream according to some embodiments. In step 412, an index file is acquired when an index file has not already been acquired or when a subsequent index file is to be acquired. In step 414, playback timing is tracked relative to a first media stream. Again, while in the stand-by mode the playback timing continues to increment as if the first media stream was being played back, such that a current location within a current index file can be tracked relative to the incrementing playback timing. In step 416, it is determined whether to transition to a next media file entry in the index file being tracked. When it is determined to transition to the next media file entry step 418 is entered to determine whether the media stream is ended. When the end is reached the process 410 terminates.

Alternatively, step 420 is entered to determine whether a subsequent index file is to be retrieved. When a subsequent index file is not to be retrieved the process advances to step 424. In those instances where a subsequent index file is to be retrieved, step 422 is entered where the subsequent index file is acquired, such as request the subsequent index file from a remote source. In step 424 a next media file entry in the index file (or the subsequent index file) is identified. In step 426 the media file entry is tracked and/or metadata or other information associated with that entry or associated with timing corresponding to that media file entry is evaluated. In step 430 it is determined whether one or more events are detected. When an event is detected step 432 is entered where one or more relevant actions are taken relative to the event (e.g., displaying information, transitioning to a playback mode, or the like). When it is determined in step 430 that an event is not detected and typically following step 432 the process returns to step 414 to continue tracking playback timing and the index file. It is noted that in some instances the action may transition a media stream from stand-by to playback to initiate playback or recording of the media stream. Accordingly, in some instances the process 410 may terminate as a result of the event.

As described above, multiple media streams can be tracked while in the stand-by mode. Because the media files associated with a tracked media stream in the stand-by mode are not received, the amount of bandwidth used in tracking the index file is typically a small percentage of what would otherwise be used in obtaining the media files, and typically a relatively small portion of the overall available bandwidth. Accordingly, in some embodiments, multiple media streams can simultaneously be tracked in the stand-by mode. When multiple media streams are tracked the process 410 of FIG. 4 can be implemented for each media stream, intermittently between the plurality of media streams, for only one or more selected media streams or the like. This allows events to be detected relative to one or more tracked media streams and actions to be taken (e.g., notification to the user of the event).

In some embodiments, the playback device may notify one or more remote servers and/or content sources that a first media stream is in or has transitioned to a stand-by mode. As such, the one or more remote servers, sources or other devices operating independent or cooperatively can prevent the distribution of the media files to the playback device while still distributing the index files. This way the playback device does not have to decide which media files to request.

Figure 5:
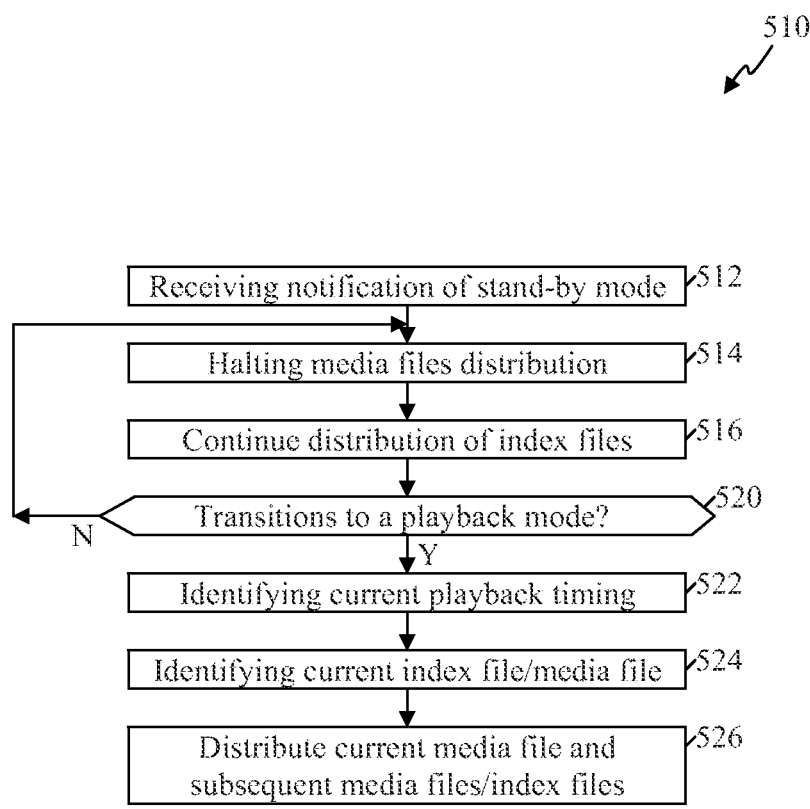
FIG. 5 depicts a simplified flow diagram of a process of a server or content source in managing the distribution of media streams.

FIG. 5 depicts a simplified flow diagram of a process 510 of a server or content source in managing the distribution of media streams. Again, the process 510 can be implemented by one or more servers or devices operating independently or cooperatively. In step 512, a notification is received from over a distributed network and from a playback device that a first stream is in a stand-by mode. In step 514, the content source halts further communication of media files of the first media stream to the playback device while the first media stream is in the stand-by mode. In step 516, the content source continues to distribute index files of the first media stream to the playback device.

In step 520, it is determined whether the first media stream has transitions from the stand-by mode to a playback mode at the playback device. When a transition to a playback mode has not been detected the process returns to step 514 to continue to halt the distribution of media files to the playback device where the first media stream is in the stand-by mode. Alternatively, when a transition to the playback mode has occurred the process 510 advances to step 522 to identify a current playback timing. In some instances the notification of the transition to playback mode may include timing information that can be used by the content source and/or can be verified at the content source. In step 524, the content source identifies a current media file identified within a current index file corresponding to the current playback timing. In step 526, the content source distributes the current media file and subsequent media files and index files to the playback device while the first stream is in the playback mode.

Figure 6:
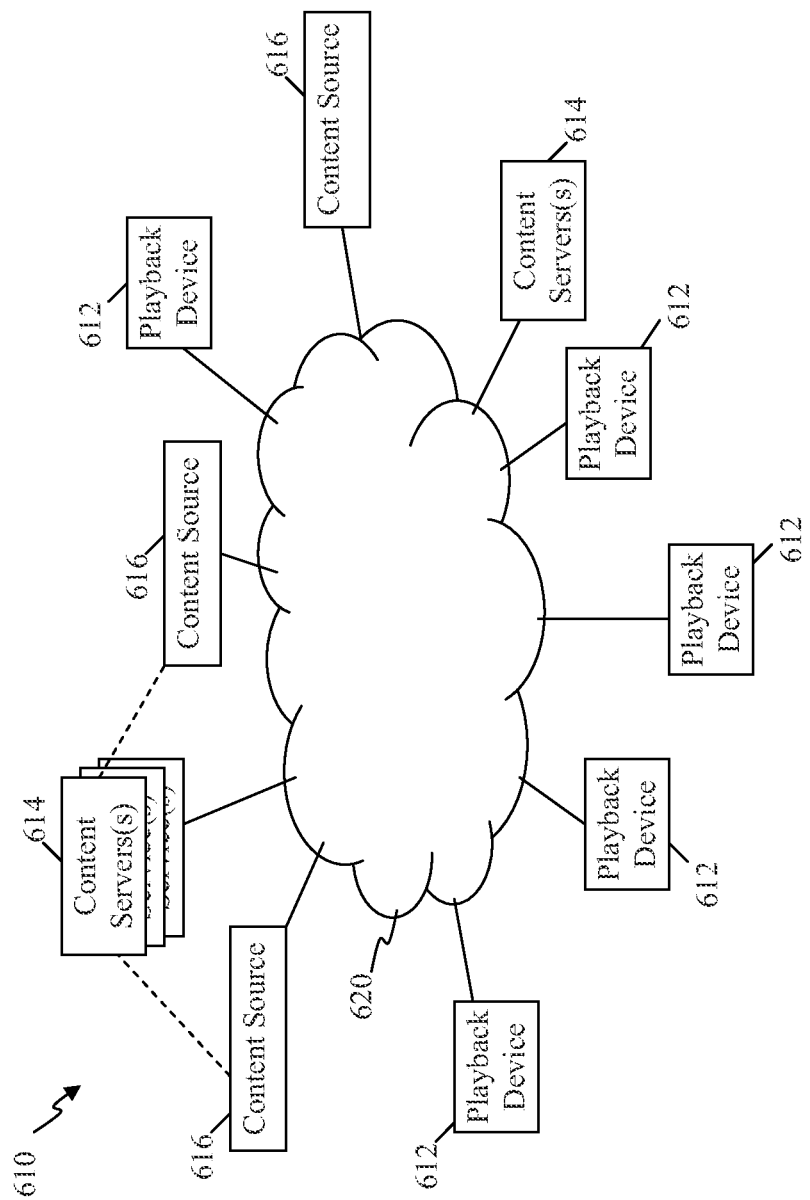
FIG. 6 depicts a simplified block diagram of a system configured to provide the distribution and playback of media streams according to some embodiments.

FIG. 6 depicts a simplified block diagram of a system 610 configured to provide the distribution and playback of media streams according to some embodiments. The system includes one or more playback devices 612, one or more content servers, services or devices 614, one or more content sources 616, and a distributed network 620 providing communication channels or links between two or more of the devices of the system. The content servers 614 are remote from the playback devices 612, and the playback devices 612 can communicate over the distributed network 620 with the one or more remote content servers 614 in selecting and/or obtaining access to media streams. In some instances, the content servers 614 distribute the media streams, while in other instances a content server 614 may direct the playback device 612 to another content server 614 or a content source 616 to acquire the media stream, index files and/or media files. Further, the content servers 614 may in some embodiments directly couple with a content source 616, which might include digital storage accessible by the content server 614, while in other instances the content server may communicate with one or more content sources over the distributed network 620. Again, the one or more content servers 614 and/or content sources 616 may provide live content (such as the output of a video) or prerecorded content (such as a media file or disc that is formatted into media files and index files for streaming). In the case of a live source the index file may give information about media files that have not yet been written.

As described above, the playback devices 612 obtain one or more index files from the media stream. From the index file the playback device 612 identifies a media file. In playback mode the media stream uses the location information of the media file identified in the index file to access a content server 614 or a content source 616 to obtain the identified media file. For example, the index file may define a link, URL, or other such access or location information that allows the playback device 612 to retrieve the media file to be played back and/or recorded at the playback device 612. The playback devices 612 can be substantially any relevant playback device configured to receive media streams and track one or more media streams while not acquiring media files associated with the tracked media streams. For example, the playback devices 612 can be televisions (e.g., IPTVs), computers, laptops, wireless devices (e.g., smart phones) and other such devices.

The one or more content servers 614 can be substantially any server, device or collection of devices configured to provide playback devices 612 with media streams and/or direct playback devices to sources of media streams. For example, one or more of the content servers 614 can be servers operating under the BRAVIA Internet Video Link (BIVL) service provided by Sony Corporation. Again, the content server 614 can direct the playback device to other sources (e.g., other servers 614 or content sources 616) for the media streams and/or media files. Further, one or more of the content servers may be distributed over the network 620 and/or cooperated with other servers. The network 620 can be the Internet, a WAN, a LAN or other such networks or combinations of such networks that are configured to allow the distribution of media streams and media files.

Figure 7:
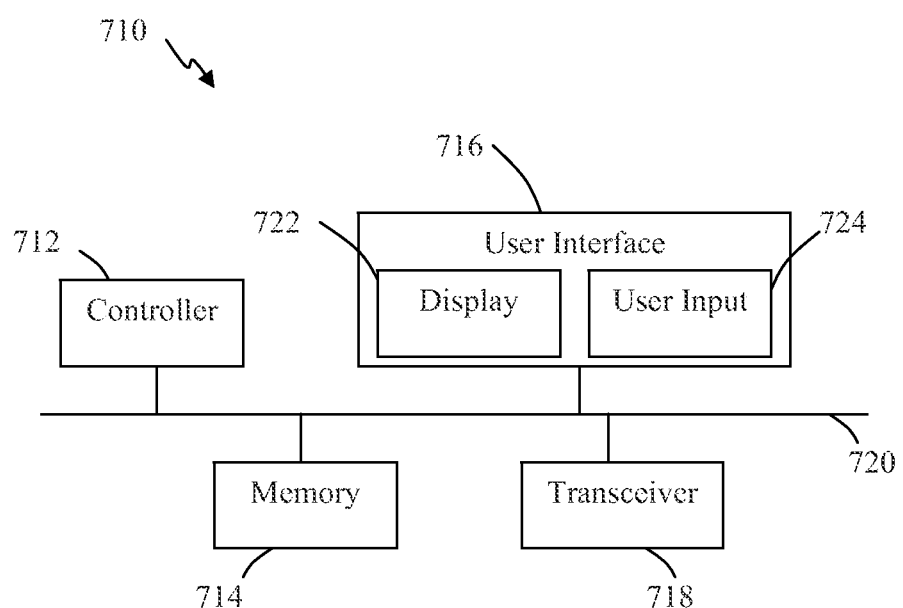
FIG. 7 illustrates a system for use in implementing methods, techniques, devices, apparatuses, systems, servers, sources and the like of managing content in accordance with some embodiments.

The methods, techniques, devices, servers, sources, systems and the like described herein may be utilized, implemented and/or run on many different types of systems. Referring to FIG. 7, there is illustrated a system 710 that may be used for any such implementations, in accordance with some embodiments. One or more components of the system 710 may be used for implementing any system, apparatus or device mentioned above or below, such as for example any of the above or below mentioned playback devices 612, remote content servers 614, content sources 616, etc. However, the use of the system 710 or any portion thereof is certainly not required.

By way of example, the system 710 may comprise a controller or processor module 712, memory 714, a user interface 716, and one or more communication links, paths, buses or the like 720. A power source or supply (not shown) is included or coupled with the system. The controller 712 can be implemented through one or more processors, microprocessors, central processing unit, logic, local digital storage, firmware and/or other control hardware and/or software, and may be used to execute or assist in executing the steps of the methods and techniques described herein, and control various communications, programs, content, listings, services, interfaces, etc. The user interface 716 can allow a user to interact with the system 710 and receive information through the system. In some instances, the user interface 716 includes a display 722 and/or one or more user inputs 724, such as a remote control, keyboard, mouse, game controller, buttons, touch screen, etc., which can be part of or wired or wirelessly coupled with the system 710.

Typically, the system 710 further includes one or more communication interfaces, ports, transceivers 718 and the like allowing the system 710 to communication over the distributed network 620, other networks or communication channels with other devices and/or other such communications. Further the transceiver 718 can be configured for wired, wireless, optical, fiber optical cable or other such communication configurations or combinations of such communications. The system 710 comprises an example of a control and/or processor-based system.

The memory 714, which can be access by the controller 712, typically includes one or more processor readable and/or computer readable media accessed by at least the controller 712, and can include volatile and/or nonvolatile media, such as RAM, ROM, EEPROM, flash memory and/or other memory technology. Further, the memory 714 is shown as internal to the system 710; however, the memory 714 can be internal, external or a combination of internal and external memory. The external memory can be substantially any relevant memory such as, but not limited to, one or more of flash memory secure digital (SD) card, universal serial bus (USB) stick or drive, other memory cards, hard drive and other such memory or combinations of such memory. The memory 714 can store code, software, executables, scripts, data, content, multimedia content, programming, programs, media stream, media files, textual content, log or history data, user information and the like. In some embodiments, the memory 714 stores software that implements the user interfaces and allows the user to interact with the system 710.

In some embodiments, one or more of the embodiments, methods, processes, approaches, and/or techniques described above or below may be implemented in a computer program executable by a processor-based system. By way of example, such a processor based system may comprise the processor based system 710, or a computer, IP enabled television, IP enabled Blu-ray player, entertainment system, game console, graphics workstation, cellular phone, smart phone, tablet, etc. Such computer program may be used for executing various steps and/or features of the above or below described methods, processes and/or techniques. That is, the computer program may be adapted to cause or configure a processor-based system to execute and achieve the functions described above or below. For example, such computer programs may be used for implementing any embodiment of the above or below described steps, processes or techniques for allowing a playback device 612 to access a remote content server 614 and/or content source 616 over the distributed network 620. As another example, such computer programs may be used for implementing any type of tool or similar utility that uses any one or more of the above or below described embodiments, methods, processes, approaches, and/or techniques. In some embodiments, program code modules, loops, subroutines, etc., within the computer program may be used for executing various steps and/or features of the above or below described methods, processes and/or techniques. In some embodiments, the computer program may be stored or embodied on a computer readable storage or recording medium or media, such as any of the computer readable storage or recording medium or media described herein.

Accordingly, in some embodiments the present embodiments provide a processor or computer program product comprising a medium for embodying a computer program for input to a processor or computer and a computer program embodied in the medium for causing the processor or computer to perform or execute steps comprising any one or more of the steps involved in any one or more of the embodiments, methods, processes, approaches, and/or techniques described herein. For example, some embodiments provide a computer-readable storage medium storing a computer program for use with a computer simulation, the computer program adapted to cause a computer and/or processor based system to execute steps comprising: maintaining, at a playback device, a first media stream in a stand-by mode comprising: continuing to request, from over a distributed network, a first index file of the first media stream, where the first index file identifies a plurality of media files of the first media stream configured to be played back at the playback device, while not acquiring the media files of the first media stream while the first media stream is in the stand-by mode; and tracking the first index file relative to a playback timing of the first media stream, where the playback timing continues to increment while the first media stream is in the stand-by mode; determining whether an instruction is received to switch the first media stream from the stand-by mode to a playback mode; transitioning the first media stream to a playback mode, comprising: identifying, in response to determining that the instruction is received to switch the first media stream to the playback mode, from the tracking of the first index file a current first media file defined within the first index file and corresponding to a playback timing at the time of determining that the instruction is received to switch the first media stream to the playback mode; and acquiring at the playback device, from over the distributed network, the first media file.

The tracking of one or more media streams can be performed on substantially any relevant media stream formatted with an index or other type of listing file and corresponding media files identified in the index file. For example, the tracking can allow user's watching IPTV to transition between programs (e.g., using a "jump" or "last" button on a remote control) while reducing the lag in initiating playback in response to a transition between media streams. Similarly, often security systems include multiple cameras capturing video of one or more areas and/or locations the captured video is displayed to security personal. In many instances the view seen by the security personal is transitioned between different cameras. As such, the lag resulting from a transition between cameras and/or the bandwidth needed in achieve the transition can be reduced by continuing to track media streams from different cameras in stand-by while these media streams are not displayed to a user.

The present embodiments provide methods to place a live and/or prerecorded media stream in a stand-by mode so that when the user switches back to playing the media stream it starts playing back at a current location in the stream with reduced lag time. When the media stream is in stand-by mode the amount of network traffic used to track to the current location in the media stream is greatly reduced as the actual media content is not requested.

Further, the lag that would otherwise occur upon switching back to a stand-by media stream is significantly reduced relative to not having tracked the index file. In some embodiments, this reduced lag time is achieved, at least in part, through the playback device 612 continuing to acquire the index files that normally would be obtain to play back the media stream and tracks the index files relative to playback timing. The playback device 612 does not request the media files indicated in the index files as the media is not currently being displayed or recorded. With the playback device 612 following the index files, when playback is to be resumed the playback device does not have to make a request to get index information or identify a media file to be played back. The playback device has the URL for the current media file in the media stream and can directly request the media file to play. Further, with the tracking of the index files additional information, such as timing information and metadata are available that can be used by the playback device 612 and/or used to present information to a user.

Alternatively, other systems do not provide a stand-by and have to identify the source, issue a request for the media stream, identify a current playback timing, acquire media file corresponding to the playback timing and then may be able to initiate playback. This results in significant lag time between the request to start playback and the actual playing back of the requested content.

The lag in initiating playback may attempt to be reduced by continuing to receive the media stream including the index file and the media files, which are not played back and instead simply discarded. However, this results in relatively large amounts of data being transferred and relative large bandwidth usage. Alternatively, by not requesting the media files while in the stand-by mode the media stream can continue to be tracked with relatively minimal computational overhead, a small fraction of data transfer, bandwidth usage and/or network traffic, and still significantly reduce the lag in initiating playback. For example, some embodiments request from over the distributed network 620 the one or more index files for a media stream (e.g., a live media stream) when the media stream is placed in stand-by mode. This allows for less lag time when playback of that media stream is resumed. This also greatly reduces the amount of network traffic generated to track the live media stream when the playback of that media stream is not shown to a user. By tracking the location within the index files relative to the continued playback timing while in the stand-by mode the current media file is known and can be quickly requested in response to instructions to switch to the playback mode.

Some embodiments further track timing and metadata for a media stream that is in stand-by mode. As such, in some instances actions can be taken in response to the evaluation of metadata and/or other information obtained while in the stand-by mode. Additionally, some embodiments provide the user with feedback in response to a request a switch from stand-by to playback mode. In some implementations, a user interface method is provided to give feedback to the user that her/his request to switch the content has been received and is being processed. For example, in response to a request to switch from a first media stream in playback mode to a second live media stream in stand-by mode, the currently playing content of the first media stream can be dimmed while the current media file of the second media stream is being requested and decoded. Then the content of the first media stream can be replaced by the second live stream playback when the playback device 612 is able to render a first frame of the current media file of the live second media stream.

This notification, such as the dimming of the first media content, gives the user immediate feedback that her/his request to switch away from the content of the first media stream has been received by the playback device 612. Accordingly, the user is less likely to repeat the request because the user did not receive a response and thought the request (e.g., that the remote button press) was not received by the playback device. Additionally, the time when there is nothing playing back in response to the instruction to switch the second media stream is reduced or eliminated by continuing to show the currently played back content of the first media stream while preparing to start playback of the live second media stream. This can further give the user the impression that the transition was smoother and quicker as the user is not starting at "dead air" (e.g., blank or dark screen) or the amount of time a dark or blank screen is displayed can be reduced. This can be particularly useful in the times when there is a delay (e.g., delay resulting form the internet) when making the requests for the current media file of live second media stream.

The request to switch from a stand-by to a playback mode can be received through several ways, such as a user using a jump or other such button on a remote control to switch back and forth between two different media streams (e.g., between live internet streams of two different sporting events). When a live media stream on a network is on stand-by in a playback device 612, the playback device can keep requesting the index files to continue tracking along with the latest point in the media stream, while not requesting the media files indicated in the index file since the media stream is not actively being played back, recorded or otherwise being used where the media files would be needed.

When switching the media stream (e.g., live internet media stream) from stand-by to playback mode to actively playback the stream, the playback device 612 already has current index information and therefore no requests for the index file will need to be made to initiate the playback or get the index file for the current point in the stream. The playback device 612 can begin playback of the media stream quicker since it already knows the URL of the media file for the current point in the playback. Again, substantially any playback device configured to receive media streams configured with an index file and corresponding media files. For example, some embodiments can be utilized with content configured according to the M3U8 IETF standard for live media streaming that has index files that include URLs to the individual media files that make up the content of the media stream.

Some embodiments provide methods of managing content, the playback of content and/or providing stand-by mode in playing back content, such as content received over a distributed network (e.g., the Internet). For example, some embodiments provide methods comprising: playing back at a playback device a first media stream being received from over an Internet Protocol (IP) distributed network from a remote content source while the media stream is being played back, wherein the first media stream comprises a plurality of index files and corresponding to each index file a plurality of corresponding media files, where each index file directs the playback of the plurality of corresponding media files as defined within the index file and based on a playback timing; detecting, at the playback device, an instruction to transition to a stand-by mode corresponding to the first media stream being played back at the playback device at a time the instruction to transition to the stand-by mode is received; activating the stand-by mode relative to the first video; halting, in response to receiving the instruction to transition to the stand-by mode, the playback of the first media stream; continuing to track playback timing corresponding to the first media stream while not playing back the first media stream; and tracking a first index file of the first media stream relative to the playback timing of the first media stream while in the stand-by mode, and while not playing back the first media stream and not requesting, from over the distributed network, media files corresponding to the entries in the first index file.

Some embodiments additionally are configured to determine, while in the stand-by mode relative to the first media stream, whether an instruction is received to resume playback of the first media stream; activate a playback mode relative to the first media stream; identify from the tracking of the first index file, in response to determining that an instruction to resume playback of the first media stream is received, a first media file defined within the first index file and corresponding to a playback timing at the time of detecting the instruction to resume playback; request, over the distributed network, the first media file; and initiating playback, in response to the instruction to resume playback of the first media stream and in response to receiving the first media file, the first media file. In some instances, some embodiments additionally identify from the tracking of the first index file, in response to determining that an instruction to resume playback of the first media stream is received, a link or access to a first media file as defined within the first index file and corresponding to a playback timing at the time of detecting the instruction to resume playback; and acquire, over the distributed network, the first media file using the identified link or access.

Some embodiments further identify, while in the stand-by mode, an end of the first index file; and continue to request, while in the stand-by mode corresponding to the first media stream, one or more subsequent index files of the first media stream from the remote content source supplying the first media stream while not requesting media files corresponding to entries in the one or more subsequent index files; wherein the one or more subsequent index files comprise the first index file. In some instances, the detection of the instruction to transition to the stand-by mode comprises detecting an instruction to implement playback of a second media stream. The instruction to transition to the stand-by mode in some implementations can further comprise detecting an instruction to change from a first channel corresponding to the first media stream to a second channel corresponding to the second media stream, and the instruction to resume playback of the first media stream comprises an instruction to change back to the first channel. Some embodiments further comprise: tracking a second index file of a third media stream relative to playback timing of the third media stream while playing back the second media stream, while in the stand by mode relative to the first media stream, and while not requesting media files corresponding to entries in the second index file of the third media stream; and identifying, in tracking the second index file, an event relevant to the second index file; and displaying a notification of the event while playing back the second media stream and not playing back the first media stream or the third media stream.

Other embodiments provide methods of playing back content comprising: playing back at a playback device a first media stream being received from over an Internet protocol (IP) distributed network from a remote content source while the media stream is being played back; detecting, at the playback device, an instruction to transition to a stand-by mode corresponding to the first media stream being played back at the playback device at a time the instruction to transition to the stand-by mode is received; halting, in response to receiving the instruction to transition to the stand-by mode, the playback of the first media stream; continuing to request, over the distributed network from the remote content source and while in the stand by mode corresponding to the first media stream, one or more subsequent index files of the first media stream while not requesting media files corresponding to entries in the one or more subsequent index files; continuing to track playback timing corresponding to the first media stream while not playing back the first media stream; tracking the one or more subsequent index files of the first media stream relative to the playback timing while in the stand-by mode, and while not playing back the first media stream and not requesting from the remote source media files corresponding to the entries in the one or more subsequent index files; determining, while in the stand-by mode relative to the first media stream, whether an instruction is received to resume playback of the first media stream; identifying from the tracking of the one or more subsequent index files, in response to determining that an instruction to resume playback of the first media stream is received, a first media file defined within one of the one or more subsequent index files and corresponding to a playback timing at the time of detecting the instruction to resume playback; requesting, over the distributed network and from the remote content source, the first media file; and initiating playback, in response to the instruction to resume playback of the first media stream, the first media file in accordance with the one of the one or more subsequent index files.

Yet other embodiments provide for methods comprising: entering stand-by mode such that playback of a media stream is halted, where the media stream is received over an IP distributed network from a remote content source; reducing lag time in subsequently resuming of playback of the media stream, comprising: continuing to track progress of playback of the media stream without acquiring media files of the media stream while in the stand-by mode; identifying a media file that is defined to be playing a the time a request to resume playback of the media stream is received without further requests over the distributed network; and requesting from the remote source the media file.

Additionally, some embodiments include methods comprising: playing back at a playback device a first video being received from over a distributed network from a remote content source while the first video is being played back; detecting, at the playback device, an instruction to transition to a stand-by mode corresponding to the first video being played back at the playback device at a time the instruction to transition to the stand-by mode is received; halting, in response to receiving the instruction to transition to the stand-by mode, the playback of the first video; continuing to request, over the distributed network from the remote content source and while in the stand by mode corresponding to the first video, one or more subsequent index files of the first video from the remote content source supplying the first video while not requesting video files corresponding to entries in the one or more subsequent index files; continuing to track playback timing corresponding to the first video while not playing back the first video and not requesting from the remote source the video files corresponding to the entries in the one or more subsequent index files; tracking the one or more subsequent index files relative to the playback timing while in the stand by mode not playing back the first video and not requesting from the remote source the video files corresponding to the entries in the one or more subsequent index files; detecting, while in the stand-by mode relative to the first video, an instruction to resume playback of the first video; activating a playback mode relative to the first video; and identifying from the tracking of the one or more subsequent index files, in response to the instruction to resume playback, a first index file and a first video file defined within the first index file corresponding to a playback timing as defined within the first index file corresponding to the time when detecting the instruction to resume playback. In some instances, embodiments further initiate playback of a second video file while in the stand-by mode corresponding to the first video.

Yet other embodiments provide methods comprising: playing back at a playback device a first video, wherein the first video comprises a plurality of index files and corresponding to each index file a plurality of corresponding video files, where each index file directs the playback of the plurality of corresponding video files as defined within the index file and based on a playback timing; receiving, at the playback device, an instruction to transition to a stand-by mode corresponding to the first video being played back at the playback device at a time the instruction to transition to the stand-by mode is received; halting, in response to receiving the instruction to transition to the stand-by mode, the playback of the first video; continuing to request, from over a distributed network and while in the stand-by mode corresponding to the first video, one or more subsequent index files while not requesting video files corresponding to entries in the one or more subsequent index files; continuing to monitor timing relative to the index file while not playing back video files.

Still other embodiments provide methods of managing playback of content, the methods comprise: maintaining, at a playback device, a first media stream in a stand-by mode comprising: continuing to request, from over a distributed network and from a remote source, an index file of the first media stream, where the first index file identifies a plurality of media files of the first media stream configured to be played back at the playback device, while not acquiring the media files of the first media stream while the first media stream is maintained in the stand-by mode; and tracking the index file relative to a playback timing of the first media stream, where the playback timing continues to increment while the first media stream is in the stand-by mode; determining whether an instruction is received to switch the first media stream from the stand-by mode to a playback mode; identifying, in response to determining that the instruction is received to switch the first media stream to the playback mode, from the tracking of the index file a current first media file defined within the index file and corresponding to a playback timing at the time of determining that the instruction is received to switch the first media stream to the playback mode; acquiring at the playback device, from over the distributed network and from the remote source, the first media file; and initiating playback, at the playback device, of the first media file in response to switching the first media stream to the playback mode.

Some embodiments provide methods of managing the distribution of content. These methods comprise: receiving, from over a distributed network and at a content server or source, a notification from a playback device that a first stream is in a stand-by mode; continuing to distribute index files of the first media stream to the playback device while the first stream is in stand-by mode at the playback device; halting further communication to the playback device of media files of the first media stream while the first media stream is in the stand-by mode; determining whether the first media stream has transitions to a playback mode at the playback device; identifying a current playback timing, in response to determining the first media stream has transitions to the playback mode at the playback device; identifying a current media file identified within a current index file corresponding to the current playback timing; and distributing the current media file and subsequent media files to the playback device.

In some instances, methods further comprise: tracking one or more additional index files of one or more corresponding additional media streams relative to corresponding playback timings of the one or more additional media streams while playing back the second media stream, while in the stand by mode relative to the first media stream, and while not requesting media files corresponding to entries in the one or more additional index files of the one or more corresponding additional media streams; identifying, in tracking the one or more additional index files, an event relevant to one of the one or more additional index files; halting playback of the second media stream; and activating playback of the one of the one or more additional media streams in response to the event.

Some embodiments provide a computer-readable storage medium storing one or more computer programs for use with a computer simulation, the one or more computer programs adapted to cause a computer and/or processor based system to execute steps comprising: playing back at a playback device a first media stream being received from over an IP distributed network while the media stream is being played back; detecting, at the playback device, an instruction to transition the first media stream to a stand-by mode; halting, in response to receiving the instruction to transition to the stand-by mode, the playback of the first media stream; tracking a first index file of the first media stream relative to playback timing of the first media stream while in the stand-by mode, and while not playing back the first media stream and not requesting, from over the distributed network, media files corresponding to the entries in the first index file; determining, while in the stand-by mode relative to the first media stream, whether an instruction is received to resume playback of the first media stream; identifying from the tracking of the first index file, in response to determining that an instruction to resume playback of the first media stream is received, access to a first media file defined within the first index file and corresponding to a playback timing at the time of detecting the instruction to resume playback; acquiring, over the distributed network, the first media file using the identified access; and initiating playback, in response to the instruction to resume playback of the first media stream, the first media file.

Other embodiments provides a computer-readable storage medium storing one or more computer programs for use with a computer simulation, the one or ore computer programs adapted to cause a computer and/or processor based system to execute steps comprising: receiving, from over a distributed network and at a content server or source, a notification from a playback device that a first stream is in a stand-by mode; continuing to distribute index files of the first media stream to the playback device; halting further communication of media files of the first media streams to the playback device while the first media stream is in the stand-by mode; determining whether the first media stream has transitions to a playback mode at the playback device; identifying a current playback timing, in response to determining the first media stream has transitions to the playback mode; identifying a current media file identified within a current index file corresponding to the current playback timing; and distributing over the distributed network to the playback device the current media file and subsequent media files.

Some embodiments provide methods of claim managing playback comprising maintaining a first media stream in a stand-by mode and continuing to track index files of the first media stream while in the stand-by mode. In some instances, the methods further comprise tracking the first media stream while in the stand-by mode and determining whether one or more events occur. Additionally, some embodiments further comprise identifying, from the event, a rating of content of the first media stream; comparing the rating from the metadata to a rating limit set for playback; and determining from the comparison whether the stream content has a predefined relationship with the rating limit (e.g., determining whether the rating is acceptable based on the rating limit).

Similarly, some embodiments identify, for example from metadata of the index files of a media stream, a rating (e.g., parental guidelines, parental setting, motion picture ratings, or the like) of content of the media stream; compare the rating from the metadata to a rating limit set for playback; determine whether the rating of the content of the first media stream has a predefined relationship with the rating limit; and transition the first media stream between the playback mode and the stand-by mode in response to determining that the rating of the content of the first media stream has the predefined relationship with the rating limit. For example, in response to determining when the media stream in a playback mode that the detected rating has the predefined relationship with the rating limit (e.g., a rating of a first content of the media stream is a "TV-G" rating, and a subsequent rating of a second subsequent content of the media stream is "TV-MA," with the rating limit being "TV-PG" or "TV-14") the media stream can be transitioned from the playback mode to the stand-by mode. Additionally or alternatively, for example, when the media stream is in a stand-by mode and the detected rating has the predefined relationship with the rating limit (e.g., the rating of a first content of the media stream is an "R" rating, and a subsequent rating of a second content of the media stream is "PG," with the rating limit being "PG" or "PG-13") the media stream can be transitioned from the stand-by to the playback mode.

Further, the first media stream, in some implementations, may be maintained in the stand-by mode while the ratings of content of the media stream do not have the predefined relationship with the rating limit. The ratings can be defined in the index file, metadata of the index file, received with alternate content (e.g., electronic programming guide), or some other source. The rating limit can be set or defined by a user, by a CE device, by metadata of the media stream, a user profile and/or other sources. For example, the rating limit may be defined within the CE device and set by a parent, and/or defined within a profile of the CE device or user profile accessed by the CE device.

Some methods further transition from a playback mode to a stand-by mode in response to tracking metadata of the media stream. Additionally, in some instances, alternate content is played back while the first media stream is in stand-by mode. The alternative content, in some embodiments, can comprise a second media stream. In other embodiments, the alternate content can comprise content from a non-stream content source.

Other embodiments provide method of managing content, comprising maintaining a first media stream in a stand-by mode. Some of these methods further monitor metadata of an index file of the first media stream, and display information derived from the meta-data. Other embodiments additionally or alternatively comprise transitioning a first media stream from a playback state to a stand-by state in response to a navigation instruction from playing the first media stream to playing other content. In some instances, the other content can comprise a second media stream, while in other instances, the other content can comprise content from a non-stream content source.

Further embodiments track metadata of a first media stream, and further comprise determining whether a detected event triggers a predefined instruction; and transitioning the first media stream from a stand-by state to a playback state when the first media stream is not already in the playback state. Additionally or alternatively, some embodiments further comprise logging at least some of the metadata. Still other embodiments comprise recording at least some of the metadata. Similarly, some embodiments may log a detected event, and/or record the detect event or information relative to the detected event.

Some embodiments further comprise: one or more index files produced for a first media stream, where at least one of the one or more index files comprises metadata. In some implementations, the metadata further indicates one or more events related to playback timing of the first media stream. For example, a first media stream may comprise video captured from a security camera aimed at a door, and the first media stream may further comprise metadata comprising information identifying timing of when a door sensor detected that the door was opened or closed. Additionally or alternatively, the one or more index files in some embodiments can further comprise information (e.g., timing, employee ID, etc.) for an event generated as a result of action occurring at or proximate where the first media stream is capture (e.g., an event generated by an employee scanning their badge by a reader proximate the door). That action or a separate action may give details of changes in the locked state of the door that happened as a result of the badge scan. Some embodiments may further identify an event when a motion detector monitoring an area (e.g., an area similar to that being captures by a security camera) detects motion. Other embodiments comprise incorporating metadata into one more index files and/or otherwise associating metadata with index files. For example, metadata can be generated that gives details (e.g., timing, points, team, resulting overall score, etc.) of a sporting event or the like being captured as the first media stream that occur during a sporting event.

Still other embodiments provide methods, comprising: determining portions of a media stream of interest are based on metadata of the media stream. For example, the determining portions of the media stream of interest can comprise identifying portions of a stream relevant to a timing when a motion detector sensed motion. In some embodiments, the portions of the media stream of interest are prior to the current timing offset into the first media stream, and/or the timing offset of a beginning of the current index file. Metadata of the media stream may identify the media file or files that contain the media corresponding to the points of interest. A playback device may use index files that it retrieved previously, and cached, to determine the media file and/or files corresponding to the points of interest. The playback device may additionally or alternatively request previous index files to determine the media file and/or files corresponding to the points of interest.

Some embodiments comprise issuing requests for media at one or more previous points of interest in a media stream.

Further, the requested previous media may be recorded. The requested previous media may additionally or alternatively be played.

Some embodiments provide methods of managing content, these methods can comprise: monitoring metadata of one or more index files of a media stream. In some implementations, the methods further comprise, in response to monitoring the metadata, identifying one or more events, displaying data, taking action based on one or more events, and/or other such action. Further, the monitoring and/or taking one or more actions can, in some instances, be implemented while the media stream is in a playback mode, such as displaying a game score, filtering based on rating changes, controlling recording of the stream, and/or other such actions. Additionally or alternatively, the monitoring and/or taking one or more actions can, in some instances, be implemented while the media stream is in a stand-by mode.

While the invention herein disclosed has been described by means of specific embodiments, examples and applications thereof, numerous modifications and variations could be made thereto by those skilled in the art without departing from the scope of the invention set forth in the claims.

What is claimed is:

1. A method comprising:
   playing back at a playback device a media stream being received over a network while the media stream is being played back, wherein the media stream comprises one or more index files and a plurality of media files configured to be played back, and wherein each of the one or more index files comprises: a list of one or more media files, one or more lists of access information, and corresponding playback timing associated with each of the media files in the list;
   detecting, at the playback device, a stand-by instruction to transition the media stream to a stand-by mode;
   halting, in response to detecting the stand-by instruction, the playback of the media stream at a first media file of the media stream;
   tracking the one or more index files of the media stream relative to playback timing of the media stream while in the stand-by mode, wherein the playback timing continues to increment while the first media stream is in the stand-by mode;
   not requesting the media content and not acquiring one or more other media files of the media content while the media content is in the stand-by mode and continuing to track the index files of the media content while the media content is in the stand-by mode and while not acquiring the one or more other media files of the media content while the media content is in the stand-by mode;
   detecting, at the playback device, a resume playback instruction to transition the media stream to a playback mode;
   identifying a current playback timing corresponding to a time when the resume playback instruction is detected following a time period while the first media stream was paused and not being played back;
   identifying, through the tracking of the one or more index files, a second media file corresponding to the current playback timing and intended to be played back at the current playback timing that is separated in the playback timing from the first media file based on the incremented timing consistent with the time period while the first media stream was paused such that the one or more other media files designated according to the playback timing in the one or more index files between the first media file and the second media file are not acquired and not played back; and
   initiating playback of the second media file such that the one or more other media files designated according to the playback timing in the one or more index files between the first media file and the second media file are not acquired and not played back.

2. The method of claim 1, wherein the media stream is a live media stream.

3. The method of claim 1, wherein the initiating the playback of the second media file comprises not playing back the one or more other media files designated in the one or more index files to be played back between the first media file and the second media file.

4. The method of claim 1, wherein the tracking the one or more index files of the media stream comprises tracking the one or more index files in accordance with playback timing as the playback timing continues to increment while in the stand-by mode; and
   wherein the identifying the current playback timing comprises identifying the playback timing that is separated by the period of time from a time when the playback of the media stream is halted at the first media file.

5. The method of claim 4, wherein the period of time between the time when the playback of the media stream is halted and the current playback timing corresponds to the one or more other media files designated in the one or more index files.

6. The method of claim 1, wherein the detecting the resume playback instruction comprises receiving an instruction to switch from playing back a media content in the playback mode to instead playing back the media stream.

7. The method of claim 6, further comprising:
   transitioning the media content from the playback mode to the stand-by mode in response to the instruction to switch from playing back the media content back the media stream; and
   continuing to track index files of the media content while the media content is in the stand-by mode and while not acquiring media files of the media content while the media content is the stand-by mode.

8. The method of claim 1, further comprising:
   requesting one or more subsequent index files of the media stream corresponding to playback timing following the first index file, wherein the one or more subsequent index files identify some of the plurality of media files of the media stream configured to be played back at the playback device.

9. The method of claim 1, further comprising:
   tracking metadata of the media stream while the media stream is in the stand-by mode;
   evaluating the metadata;
   detecting, based on the evaluation of the metadata, an occurrence of an event; and
   taking a predefined action, defined before the detection of the occurrence of the event, in response to detecting the occurrence of the event.

10. The method of claim 9, wherein the taking the predefined action comprises:
    identifying an instruction based on the detected event to initiate recording of the media stream;
    transitioning the media stream to the playback mode; and
    recording the first index file, the first media file and subsequent media files in response to the detecting the instruction to record the media stream.

11. The method of claim 9, wherein the taking the predefined action comprises displaying a notification corresponding to the event.

12. The method of claim 1, further comprising:
reducing traffic load and network bandwidth of the network and preventing the acquiring of the media files of the media content while the media content is in the stand-by mode and continuing to track the index files of the media content while the media content is in the stand-by mode and while not acquiring media files of the media content while the media content is in the stand-by mode.

13. A method comprising:
playing back at a playback device a media stream, wherein the media stream comprises one or more index files and a plurality of media files, wherein each of the one or more index files comprises: a list of one or more media files, and corresponding playback timing associated with each of the media files in the list of the one or more index files, and wherein at least one media file of the media stream is played back while another media file of the media stream is being received over a network;
detecting a stand-by instruction while playing back a first media file of the media stream;
halting the playing back of the first media file;
not requesting one or more other media files of the media stream and not acquiring the one or more other media files of the media stream while the media stream is in the stand-by mode and continuing to track the at least one of the one or more index files of the media stream while the media stream is in the stand-by mode and while not acquiring the one or more other media files of the media stream while the media stream is in the stand-by mode;
detecting a resume playback instruction;
identifying a current playback timing corresponding to a time when the resume playback instruction is detected following a time period while the playback of the first media stream was halted and not being played back;
identifying, using the one or more index files, a second media file corresponding to the current playback timing and intended to be played back at the current playback timing that is separated in the playback timing from the first media file based on continued incremented timing consistent with the time period while the first media stream was halted such that the one or more other media files designated according to the playback timing in the one or more index files between the first media file and the second media file are not played back; and
initiating playback of the second media file such that the one or more other media files designated according to the playback timing in the one or more index files between the first media file and the second media file are not acquired and not played back.

14. The method of claim 13, wherein the media stream is a live media stream.

15. The method of claim 13, further comprising:
continuing to acquire, from over the network while in the stand-by mode, the one or more index files of the media stream, wherein the one or more index files of the media stream identify the plurality of media files of the media stream configured to be played back at the playback device; and
not acquiring the one or more other media files of the media stream while the media stream is in the stand-by mode.

16. The method of claim 13, further comprising:
tracking the one or more index files relative to a playback timing of the first media stream while in the stand-by mode, wherein the playback timing continues to increment while the first media stream is in the stand-by mode; and
acquiring at the playback device, from over the network, the second media file in response to the detecting the resume playback instruction;
wherein the initiating the playback of the second media file comprises not playing back the one or more other media files designated in the one or more index files to be played back between the first media file and the second media file.

17. The method of claim 13, wherein the initiating the playback of the second media file comprises initiating playback of the second media file while not playing back the one or more other media files designated in the one or more index files between the first media file and the second media file and intended to be played back between the first media file and the second media file.

18. The method of claim 13, further comprising:
tracking one or more additional index files of one or more corresponding additional media streams relative to playback timing of the one or more additional media streams while the one or more additional media streams are in a stand-by mode
not acquiring media files corresponding to entries in the one or more additional index files of the one or more corresponding additional media streams;
identifying, in tracking the one or more additional index files, an event relevant to one of the one or more additional index files; and
taking a predefined action corresponding to the identified event.

* * * * *